United States Patent
Shin et al.

(10) Patent No.: US 10,140,985 B2
(45) Date of Patent: Nov. 27, 2018

(54) SERVER FOR PROCESSING SPEECH, CONTROL METHOD THEREOF, IMAGE PROCESSING APPARATUS, AND CONTROL METHOD THEREOF

(71) Applicant: Samsung Electronics Co., Ltd., Suwon-si (KR)

(72) Inventors: Yong-wook Shin, Osan-si (KR); Ji-hye Chung, Seoul (KR); Seung-min Shin, Bucheon-si (KR); Hee-ran Lee, Suwon-si (KR); Sung-wook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/271,577

(22) Filed: May 7, 2014

(65) Prior Publication Data

US 2015/0012280 A1 Jan. 8, 2015

(30) Foreign Application Priority Data

Jul. 2, 2013 (KR) .................. 10-2013-0077189

(51) Int. Cl.
*G10L 15/22* (2006.01)
*G06F 3/038* (2013.01)
(Continued)

(52) U.S. Cl.
CPC .............. *G10L 15/22* (2013.01); *G06F 3/038* (2013.01); *G06F 3/167* (2013.01); *G06F 17/30* (2013.01);
(Continued)

(58) Field of Classification Search
None
See application file for complete search history.

(56) References Cited

U.S. PATENT DOCUMENTS 7,069,220 B2 6/2006 Coffman et al.
7,729,916 B2 6/2010 Coffman et al.
(Continued)

FOREIGN PATENT DOCUMENTS

| EP | 0 680 035 A1 | 11/1995 | |
| EP | 1033701 A2 * | 9/2000 | ......... G01L 15/1822 |
| KR | 10-2014-0089876 A | 7/2014 | |

OTHER PUBLICATIONS

International Search Report dated Oct. 7, 2014 issued in International Application No. PCT/KR2014/005025 (PCT/ISA/210).
(Continued)

*Primary Examiner* — Richa Mishra
(74) *Attorney, Agent, or Firm* — Sughrue Mion, PLLC

(57) ABSTRACT

A system includes a server and an image processing apparatus, and the server is provided that includes a communication interface, a storage, and a processor. The communication interface is configured to communicate with the image processing apparatus. The storage is configured to store data. The processor may provide a result of processing a first event that includes a speech of a user to the image processing apparatus in response to the first event being received from the image processing apparatus, store a record of the first event in the storage according to processing of the first event, determine a relation between the first and second events that includes a user input by a non-speech method in response to the second event being received from the image processing apparatus, and process the second event based on the record of the first event stored in the storage in response to the relation.

14 Claims, 10 Drawing Sheets

(51) Int. Cl.
*G06F 3/16* (2006.01)
*G06F 17/30* (2006.01)
*G10L 15/08* (2006.01)

(52) U.S. Cl.
CPC *G06F 2203/0381* (2013.01); *G10L 2015/088* (2013.01); *G10L 2015/226* (2013.01)

(56) References Cited

U.S. PATENT DOCUMENTS

| | | | |
|---|---|---|---|
| 8,688,725 B2* | 4/2014 | Maeda et al. | 707/758 |
| 8,880,525 B2* | 11/2014 | Galle et al. | 707/737 |
| 2003/0014260 A1* | 1/2003 | Coffman | G10L 15/26 704/275 |
| 2005/0288934 A1 | 12/2005 | Omi | |
| 2008/0037837 A1 | 2/2008 | Noguchi et al. | |
| 2009/0240668 A1 | 9/2009 | Li | |
| 2011/0054908 A1* | 3/2011 | Matsuda | G10L 15/26 704/275 |
| 2011/0112921 A1* | 5/2011 | Kennewick | G06Q 30/0601 705/26.1 |
| 2011/0144999 A1* | 6/2011 | Jang et al. | 704/270.1 |
| 2011/0313768 A1 | 12/2011 | Klein et al. | |
| 2012/0127072 A1* | 5/2012 | Kim | G10L 15/24 345/156 |
| 2013/0041666 A1 | 2/2013 | Bak | |
| 2013/0054228 A1 | 2/2013 | Baldwin et al. | |
| 2013/0144629 A1* | 6/2013 | Johnston | G06F 3/167 704/275 |
| 2014/0196092 A1 | 7/2014 | Chung et al. | |

OTHER PUBLICATIONS

Brewer et al., "Speech-Gesture Driven Multimodal Interfaces for Crisis Management", Sep. 1, 2003, 28 pages total, p. 1327-p. 1354, vol. 91, No. 9, Proceedings of the IEEE, New York, USA.
Communication dated Jan. 30, 2017 issued by European Patent Office in counterpart European Patent Application No. 14820311.0.
Communication dated Feb. 21, 2017 issued by European Patent Office in counterpart European Patent Application No. 14820311.0.
Communication dated Jul. 9, 2018 by the European Patent Office in counterpart European Patent Application No. 14820311.0.

* cited by examiner

SERVER FOR PROCESSING SPEECH, CONTROL METHOD THEREOF, IMAGE PROCESSING APPARATUS, AND CONTROL METHOD THEREOF

CROSS-REFERENCE TO RELATED APPLICATION

This application claims priority from Korean Patent Application No. 10-2013-0077189, filed on Jul. 2, 2013 in the Korean Intellectual Property Office, the disclosure of which is incorporated herein by reference in its entirety.

BACKGROUND

1. Field

Apparatuses consistent with exemplary embodiments relate to a server configured to process an image signal to be displayed as an image in a system, a control method thereof, an image processing apparatus, and a control method thereof, more particularly to a server configured to recognize a voice command of a user to perform a function or operation corresponding to the voice command, a control method thereof, an image processing apparatus, and a control method thereof.

2. Description of the Related Art

An image processing apparatus processes an image signal and/or image data received from the outside according to various types of image processing processes. The image processing apparatus may display an image based on the processed image signal on its own display panel or output the processed image signal to a display apparatus, including a panel, to display an image based on the image signal. That is, the image processing apparatus may include any device capable of processing an image signal, regardless of whether it includes a panel to display an image. For example, an image processing apparatus having a display panel may be a TV, while an image processing apparatus having no display panel may be a set-top box.

As a variety of additional and extended functions are being added to an image processing apparatus as technology develops, diverse configurations and methods of inputting user desired commands to the image processing apparatus in order to request or control these extended functions are also being developed. For example, when a user presses a key/button on a remote controller, the remote controller transmits a control signal to an image processing apparatus so that a user desired operation is performed. Currently, various configurations of controlling an image processing apparatus considering a user desire are proposed. For example, an image processing apparatus detects a motion or voice of a user and analyzes the detected data to perform a relevant operation.

SUMMARY

According to an aspect of an exemplary embodiment, there is provided a system including a server and at least one image processing apparatus, the server including a communication interface configured to communicate with the at least one image processing apparatus, a storage configured to store data, and a processor configured to provide a result of processing a first event that includes a speech of a user to the image processing apparatus in response to the first event being received from the image processing apparatus, store a record of the first event in the storage according to processing of the first event, determine a relation between the first event and a second event that includes a user input by a non-speech method in response to the second event being received from the image processing apparatus, and process the second event based on the record of the first event stored in the storage in response to the relation.

The processor may determines whether to process the second event independently of the first event or to process the second event based on the result of processing the first event when the second event is received using the record of the first event stored in the storage.

The processor may be further configured to perform retrieval from a preset database based on the first event when the first event is received, and transmit, to the image processing apparatus, one final result selected based on the second event from among a plurality of retrieval results with respect to the first event in response to the second event being received with the plurality of retrieval results being derived from the first event.

The processor may be further configured to transmit, to the image processing apparatus, the plurality of retrieval results and a request command to select one of the retrieval results when there is the plurality of retrieval results with respect to the first event, and receive, from the image processing apparatus, the second event corresponding to the request command.

The second event may be converted into a virtual voice command recognizable and received by the server.

According to an aspect of another exemplary embodiment, there is provided a control method of a server, the control method including receiving, from an image processing apparatus, a first event based on a speech of a user, providing a result of processing the first event to the image processing apparatus and storing a record of the first event according to processing of the first event, receiving, from the image processing apparatus, a second event based on a user input by a non-speech method, determining a relation between the first event and the second event, and processing the second event based on a pre-stored record of the first event in response to the relation.

The determining of the relation may include determining whether to process the second event independently of the first event or to process the second event based on the result of processing the first event using the pre-stored record stored in the storage.

The providing of the result of processing the first event to the image processing apparatus may include performing retrieval from a preset database based on the first event. The processing of the second event based on the pre-stored record of the first event may include transmitting, to the image processing apparatus, one final result selected based on the second event among a plurality of retrieval results with respect to the first event in response to the second event being received with the plurality of retrieval results being derived from the first event.

The receiving of the second event may include transmitting, to the image processing apparatus, the plurality of retrieval results and a request command configured to select one of the retrieval results when there is the plurality of retrieval results with respect to the first event and receiving, from the image processing apparatus, the second event corresponding to the request command.

The second event may be converted into a virtual voice command recognizable and received by the server.

According to an aspect of another exemplary embodiment, there is provided an image processing apparatus including a storage configured to store data, a user interface including a speech input interface configured to receive an input of a speech of a user, and a non-speech input interface configured to receive a non-speech user input, a processor configured to perform processing on an operation corresponding to a first event that corresponds to the input of the speech at the speech input interface, and a controller configured to store a record of generating and processing the first event in the storage, determine a relation between the first event and a second event, wherein the second event occurs at the non-speech input interface after the first event occurs, and control the processing of the second event based on the record of the first event stored in the storage in response to the relation.

The controller may determine whether to process the second event independently of the first event or to process the second event based on a result of processing the first event when the second event occurs using the record of the first event stored in the storage.

The controller may be further configured to display a plurality of retrieval results configured to be selected on a display, wherein the plurality of retrieval results with respect to the operation correspond to the first event, and determine whether the second event gives an instruction to select one of the retrieval results when the second event occurs when the retrieval results are being displayed.

The image processing apparatus may further include a communication interface configured to communicate with a server that performs retrieval processing on a voice command corresponding to the speech, wherein the controller may transmit the first event to the server, receive a retrieval result with respect to the first event from the server, and display the retrieval result on the display.

The controller may be further configured to convert the second event into a virtual voice command such that the server recognizes the second event, and transmits the virtual voice command to the server.

According to an aspect of another exemplary embodiment, there is provided a control method of an image processing apparatus. The control method includes generating a first event based on an input of a speech of a user, wherein a speech input interface is configured to receive the input, and performing an operation corresponding to the first event, wherein the performing of the operation corresponding to the first event includes storing a record of generating and processing the first event in a storage, generating a second event based on a non-speech user input, wherein a non-speech input interface is configured to receive a non-speech user input, determining a relation between the first event and the second event, and processing the second event based on the record of the first event in response to the relation.

The determining of the relation may include determining whether to process the second event independently of the first event or to process the second event based on a result of processing the first event using the record of the first event.

The performing of the operation corresponding to the first event may further include displaying a plurality of retrieval results configured to be selected, wherein the plurality of retrieval results with respect to the operation correspond to the first event, and wherein the determining of the relation between the first event and the second event may include determining whether the second event gives an instruction to select one of the retrieval results.

The image processing apparatus may be further configured to communicate with a server that performs retrieval processing on a voice command corresponding to the speech, transmit the first event to the server, and display a retrieval result with respect to the first event received from the server.

The image processing apparatus may be further configured to convert the second event into a virtual voice command that the server recognizes, and transmit the virtual voice command to the server.

According to an aspect of another exemplary embodiment, there is provided an image processing apparatus including a user interface including a speech input interface configured to receive an input of a speech of a user, and a non-speech input interface configured to receive a non-speech user input, a communication interface configured to communicate with a server that retrieves an operation corresponding to a voice command due to the speech, a processor configured to be provided, from the server, a result of retrieving a first event that corresponds to the input of the speech at the speech input interface, and configured to process the retrieval result, and a controller configured to convert a second event into a virtual voice command such that the server recognizes the second event, transmit the virtual voice command to the server so that the server selects one of a plurality of retrieval results based on the second event, and provide a final retrieval result when the second event gives an instruction to select one of the retrieval results based on the first event that is derived by the server.

According to an aspect of another exemplary embodiment, there is provided a user input determination system including: an image processing apparatus including: a user interface configured to receive a first input and a second input from a user; a processor configured to process the first input and the second input into a first command and a second command, respectively; and a communication interface configured to transmit the first command and the second command; and a server including: a server communication interface configured to receive the first command and the second command; and a server processor configured to determine content to be displayed based on the first command and the second command.

The processor of the image processing apparatus may be further configured to determine content to be displayed based on the first command and the second command.

The first input may be an vocalization by the user; wherein the second input may be one from a group consisting of a visual gesture and a touch; wherein the first command may be a voice command understandable by the processor and the server processor; and wherein the second command may be a virtual voice command understandable by the processor and the server processor.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
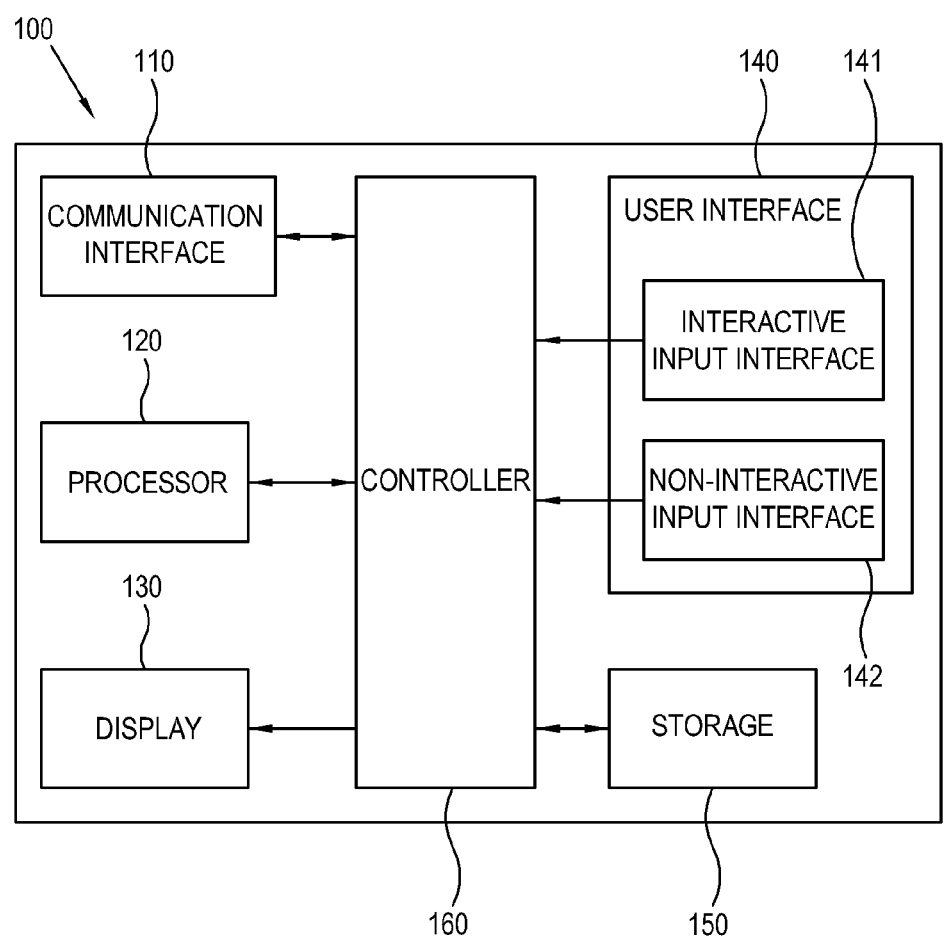
FIG. 1 is a block diagram illustrating a configuration of an image processing apparatus included in a system according to an exemplary embodiment.

Below, exemplary embodiments will be described in detail with reference to the accompanying drawings. The exemplary embodiments may be embodied in various forms without being limited to the exemplary embodiments set forth herein. Descriptions of well-known parts are omitted for clarity and conciseness, and like reference numerals refer to like elements throughout.

FIG. 1 is a block diagram illustrating a configuration of an image processing apparatus 100 included in a system according to an exemplary embodiment.

The present exemplary embodiment will be illustrated with a display apparatus capable of autonomously displaying an image, for example, a TV, as the image processing apparatus 100. However, the idea of the present embodiment may be also applied to an image processing apparatus which does not autonomously display an image but outputs image data or control information to another display apparatus, without being limited to the following description. That is, the idea of the present embodiment may be changed and modified variously and thus be applied to diverse types of devices.

Referring to FIG. 1, the image processing apparatus 100, or display apparatus 100, according to the present embodiment receives an image signal from an external image source. The display apparatus 100 may receive any image signal, which is not limited to a particular kind or particular characteristic. For example, the display apparatus 100 may receive a broadcast signal transmitted from a transmitter of a broadcasting station and tune the broadcast signal to display a broadcast image.

The display apparatus 100 may include a communication interface 110 configured to communicate with an outside by transmitting and receiving data/signals, a processor 120 configured to process data received via the communication interface 110 according to a preset process, a display 130 configured to display image data as an image when data processed by the processor 120 is the image data, a user interface 140 configured to perform an operation input by a user, a storage 150 configured to store data/information, and a controller 160 configured to control whole operations of the display apparatus 100.

The communication interface 110 may transmit and receive data so that the display apparatus 100 may perform two-way communications with an external device, such as a server. The communication interface 110 may connect to the external device locally or via a wire-based or wireless wide area/local area network in accordance with a preset communication protocol.

The communication interface 110 may be provided as a connection port for each device or an assembly of connection modules, and thus a protocol for connection or an external device as a target of connection is not limited to one kind or form. The communication interface 110 may be embedded in the display apparatus 100, or the entire communication interface 110 or part of the communication interface 110 may be additionally installed in the display apparatus 100 as an add-on or dongle form.

The communication interface 110 transmits and receives signals in accordance with a protocol designed for each connected device and thus may transmit and receive a signal based on an individual communication protocol for each connected device. In the case of image data, for example, the communication interface 110 may transmit and receive a radio frequency (RF) signal and various signals in accordance with composite video, component video, super video, Syndicat des Constructeurs d'Appareils Radiorécepteurs et Téléviseurs (SCART), high definition multimedia interface (HDMI), DisplayPort, unified display interface (UDI) or wireless High Definition (HD) standards.

The processor 120 may perform various processes on data or signals received by the communication interface 110. For example, when image data is received by the communication interface 110, the processor 120 may perform an image processing process on the image data and output the processed image data to the display 130 so that an image based on the image data is displayed on the display 130. According to another example, when a broadcast signal is received by the communication interface 110, the processor 120 may extract an image, audio data, and optional data from the broadcast signal tuned to a particular channel and may adjust the image to a preset resolution to be displayed on the display 130.

The processor 120 may perform any kind of image processing process, without being limited to, for example, decoding corresponding to an image format of image data, de-interlacing to convert interlaced image data into a progressive form, scaling to adjust image data to a preset resolution, noise reduction to improve image quality, detail enhancement, frame refresh rate conversion, or the like.

The processor 120 may perform various kinds of processes depending on types and characteristics of data, and thus a process performed by the processor 120 is not limited to an image processing process. Further, data processed by the processor 120 is not limited to data received by the communication interface 110. For example, when a user's speech is input through the user interface 140, the processor 120 may process the speech according to a preset speech processing process.

The processor 120 may be provided as an integrated multi-functional component, such as a system on chip (SOC), or as an image processing board formed by mounting separate chipsets which independently conduct individual processes on a printed circuit board and be embedded in the display apparatus 100.

The display 130 may display an image based on image signals/image data processed by the processor 120. The display 130 may be configured in various display modes using liquid crystals, plasma, light emitting diodes, organic light emitting diodes, a surface conduction electron emitter, a carbon nano-tube, nano-crystals, or the like.

The display 130 may further include an additional component depending on a display mode thereof. For example, in a display mode using liquid crystals, the display 130 includes a liquid crystal display (LCD) panel, a backlight unit to provide light to the LCD panel, and a panel driving board driving the panel.

The user interface 140 may transmit various preset control commands or information to the controller 160 based on a user manipulation or input. The user interface 140 informationalizes and transmits, to the controller 160, various events that occur by a user based on the user's intent. For example, the events by the user that may be occurring may include diverse forms, for example, a manipulation, a speech, and a gesture.

The user interface 140 is configured to detect input information in accordance with a method corresponding to a way in which the user inputs the information. To this end, the user interface 140 may be divided into an interactive input interface 141 and a non-interactive input interface 142.

The interactive input interface 141 is configured to receive a user's speech. That is, the interactive input interface 141 is provided as a microphone and detects various sounds generated in the surroundings of the display apparatus 100. The interactive input interface 141 may generally detect a speech by a user and also detect sounds produced from various environmental factors other than the user.

The non-interactive input interface 142 is configured to perform an input by a user other than a speech. In this case, the non-interactive input interface 142 may be realized in various forms, for example, a remote controller separate from the display apparatus 100, a menu key or input panel installed on an outside of the display apparatus 100, or a motion sensor or camera to detect a user's gesture.

Alternatively, the non-interactive input interface 142 may be provided as a touchscreen installed on the display 130. In this case, the user touches an input menu or UI image displayed on the display 130 to transmit a preset command or information to the controller 160.

The storage 150 may store various kinds of data according to control by the controller 160. The storage 150 is configured as a nonvolatile memory, such as a flash memory and a hard disk drive, so as to save data regardless of supply of system power. The storage 150 is accessed by the controller 160 to read, record, revise, delete or update data stored therein.

The controller 160 may be configured as a central processing unit (CPU) and may control operations of whole components of the display apparatus 100 including the processor 120 as an event occurs. For example, in a case of a user speech event, when a user's speech is input through the interactive input interface 141, the controller 160 controls the processor 120 to process the input speech to detect the word or phrase uttered by the user. Thus, when the user says a particular channel number that is detected, the controller 160 may control to switch to a broadcast image on the channel corresponding to the spoken channel number.

According to one or more exemplary embodiments, processing the input speech may be carried out by the display apparatus 100 alone or be shared with an external device in consideration of different factors, such as load or throughput of a system, which will be described below.

Figure 2:
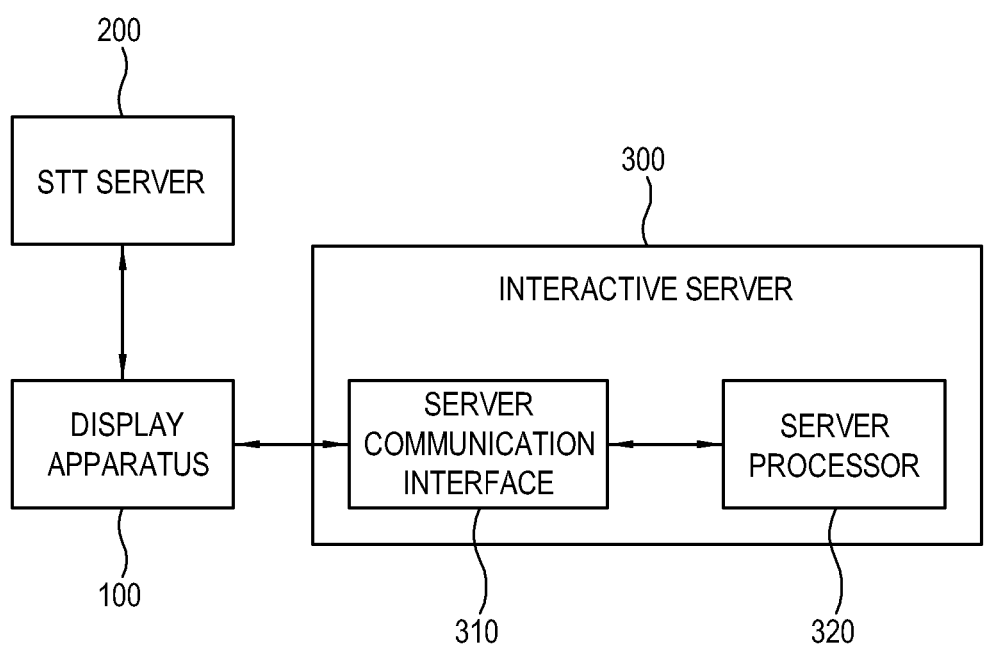
FIG. 2 is a block diagram illustrating a configuration of a server included in the system according to an exemplary embodiment.

FIG. 2 is a block diagram illustrating configurations of servers 200 and 300 included in the system according to the present embodiment.

As shown in FIG. 2, the display apparatus 100 may connect to one or more servers 200 and 300 in order to communication through a network. The display apparatus 100 may include a speech-to-text (STT) server 200 configured to convert a speech of the user into a voice command and an interactive server 300 to analyze a voice command and determine an operation or action corresponding to the voice command. According to one or more exemplary embodiments, the terms of the servers 200 and 300 are used only to distinguish each other in view of functions thereof and do not limit to features in configuration.

The STT server 200 may analyze a waveform of an audio signal and generate content of the audio signal into text. Thus, when an audio signal is received from the display apparatus 100, the STT server 200 converts the audio signal into a voice command that includes text. The speech refers to an action done by the user, and the voice command refers to data in text form obtained from content of the speech.

The interactive server 300 retrieves various operations for the display apparatus corresponding to the voice command. The interactive server 300 analyzes the voice command received from the display apparatus 100 and transmits a control signal to perform an operation corresponding to the voice command, or a result of search based on the voice command, to the display apparatus 100 according to an analysis result.

The interactive server 300 may include a server communication interface 310 to communicate with the display apparatus 100 and a server processor 320 to process a voice command received through the server communication interface 310.

In the system that includes the display apparatus 100, the STT server 200, and the interactive server 300, an operation performed when the user of the display apparatus 100 speaks will be described hereinafter.

When speech of the user is input, the display apparatus 100 transmits an audio signal of the speech to the STT server 200. The STT server 200 converts the audio signal received from the display apparatus into a voice command in a data form and transmits the voice command to the display apparatus 100. The display apparatus 100 transmits the voice command received from the STT server 200 to the interactive server 300.

The interactive server 300 analyzes content of the voice command, derives a result corresponding to the voice command, and returns the result to the display apparatus 100. For example, when the voice command includes content "who is the cast of 'Program ABC' this week?," the interactive server 300 conducts retrieval from an internal or external database with keywords "this week," "Program ABC," and "cast" and acquires a result.

Here, the database is structured according to categories of keywords, and thus a desired search result may be obtained using a specific keyword. The structured database may be realized by various methods depending on design and construction of the database, which will not be described in detail.

Further, when the interactive server 300 performs retrieval with one or more keywords derived from the voice command, a plurality of search results may be obtained. For example, in the case of voice command illustrated above, a show "Program ABC" to be broadcast this week may be broadcast at different times or on different channels.

In this case, the interactive server 300 may need to select one search result deemed proper for a user's intent from among the plurality of search results with respect to the voice command. The interactive server 300 may select one search result by two methods as follows.

In a first method, one search result is selected based on a rule autonomously set by a client of the interactive server 300, that is, the display apparatus 100. For example, when the voice command inquires about air time for a particular program and there are a plurality of programs that satisfy the air time, a program to be broadcast sooner may be selected. In a second method, when the user of the display apparatus 100 speaks to select one search result, the interactive server 300 connects the speech to a previous speech record, thereby selecting a search result proper for the user's original intent.

Because the system provides an environment for various input methods by the user, even though the display apparatus 100 supports a voice recognition input environment, the user may select a more convenient method for each situation among the various input methods. In the environment of the system for supporting multiple input modes, when a record of multiple inputs by the user is individually managed, there may be limitations in selecting or deriving a result based on the user's original intent. If the result based on the user's original intent is not provided when the user performs an input via a speech at first and then changes the input method to a different method, the user may find a user environment inconvenient.

Thus, in an interactive environment of the system provided by the interactive server 300 and the display apparatus 100, when a plurality of results are retrieved with respect to the speech of the user, and the user selects one search result through a non-speech input method, the interactive system may need to provide a search result proper for the user's original intent of the speech.

Here, the system may provide integrated management of a record of multiple input modes. That is, the interactive server 300 manages an input by a speech of the user of the display apparatus 100, an input by a gesture of the user and an input via manipulation of a remote controller by the user, and may also manage these inputs in connection with each other.

In contrast, in the conventional system, the display apparatus 100 displays a plurality of search results received from the interactive server 300 according to the second method. Here, the user may perform an input via the non-interactive input interface 142 in a non-speech method, not via a speech. Further, the conventional interactive server 300 does not connect a record of speech inputs and a record of non-speech inputs for reference, and thus a result inappropriate for a user's intent is obtained.

For example, suppose that the user says "Record Program ABC" and a plurality of contents related to "Program ABC" is displayed on the display apparatus 100. In the conventional system, when the user speaks to select one content, one content is normally selected and recorded. However, when the user selects one content in a non-speech input method, content is selected only but is not recorded, because information based on a non-speech input by the user is not transmitted to the interactive server 300 so that the interactive server 300 does not perform an operation subsequent to the speech.

In contrast, one or more exemplary embodiments suggest the following. Initially, an event that occurs by the interactive input interface 141 of the display apparatus 100 may be defined as a first event and an event occurs by the non-interactive input interface 142 may be defined as a second event. When the first event occurs from the display apparatus 100, the interactive server 300 processes the first event and stores a record of the first event. Subsequently, when the second event occurs, the interactive server 300 processes the second event based on the stored record of the processed first event. Here, when the second event occurs, the display apparatus 100 converts the second event into a voice command and transmits the voice command to the interactive server 300 so that the interactive server 300 configured to recognize a voice command recognizes the second event.

The interactive server 300 may refer to a record of previous events in determining an action on an event. The interactive server 300 may not separately manage events occurring by the interactive input interface 141 and by the non-interactive input interface 142 of the display apparatus 100 but manages the events in an integrated manner. Thus, the interactive server 300 may refer to a previous event in determining an action on a new event regardless of whether the previous event occurs by the interactive input interface 141 or by the non-interactive input interface 142.

For example, when a plurality of results are retrieved with respect to the first speech of the user, the interactive server 300 provides the plurality of search results to the user for selection. Here, although the user inputs an instruction to select one search result in a non-speech method, the interactive server 300 may associate a new event with a previous event even though the two events are input in different methods. Accordingly, a user desired search result is derived and provided to the user.

Figure 3:
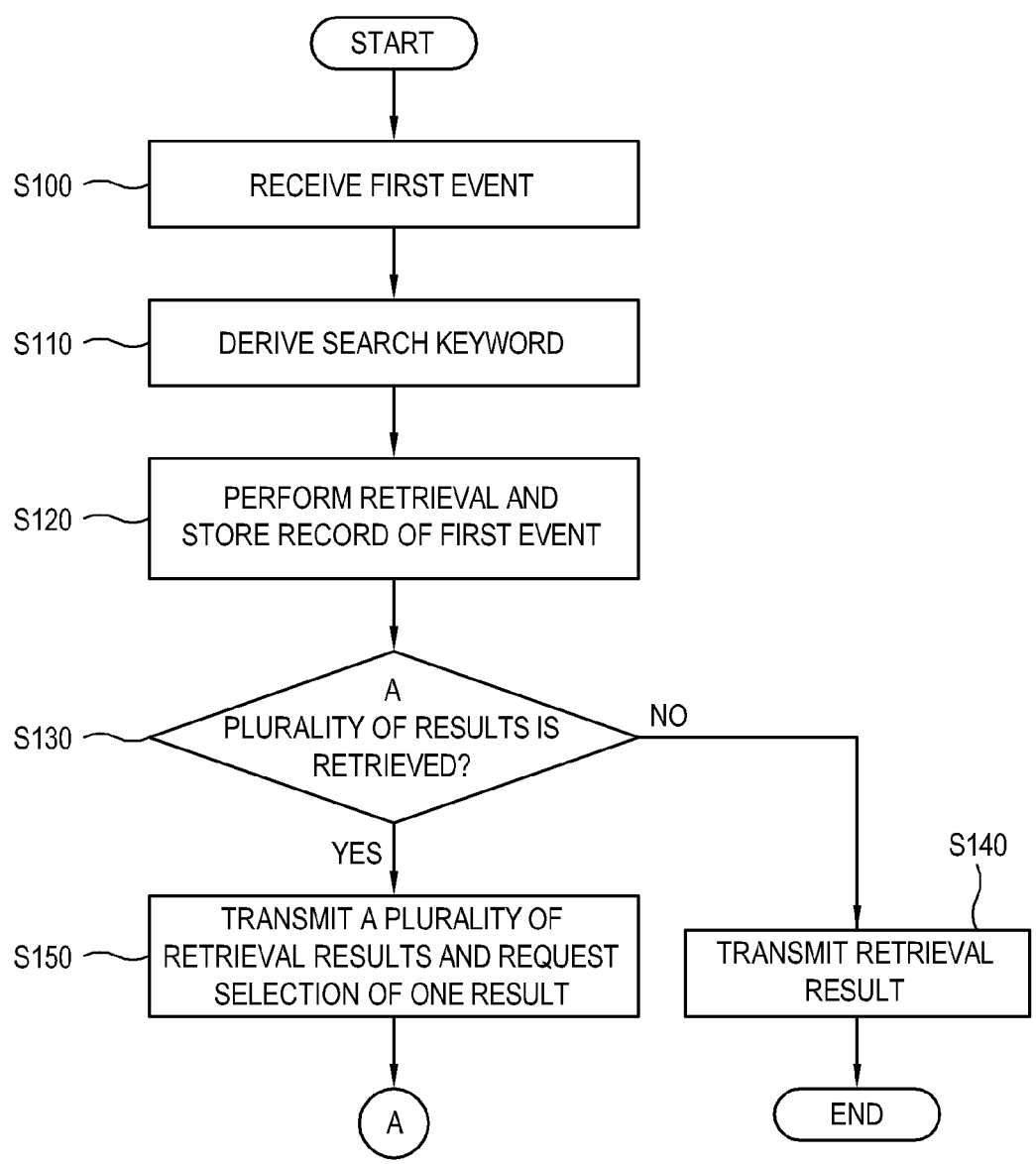
FIGS. 3 and 4 are flowcharts illustrating a method where an interactive server provides a search result corresponding to an event to a display apparatus according to one or more exemplary embodiments.
Figure 4:
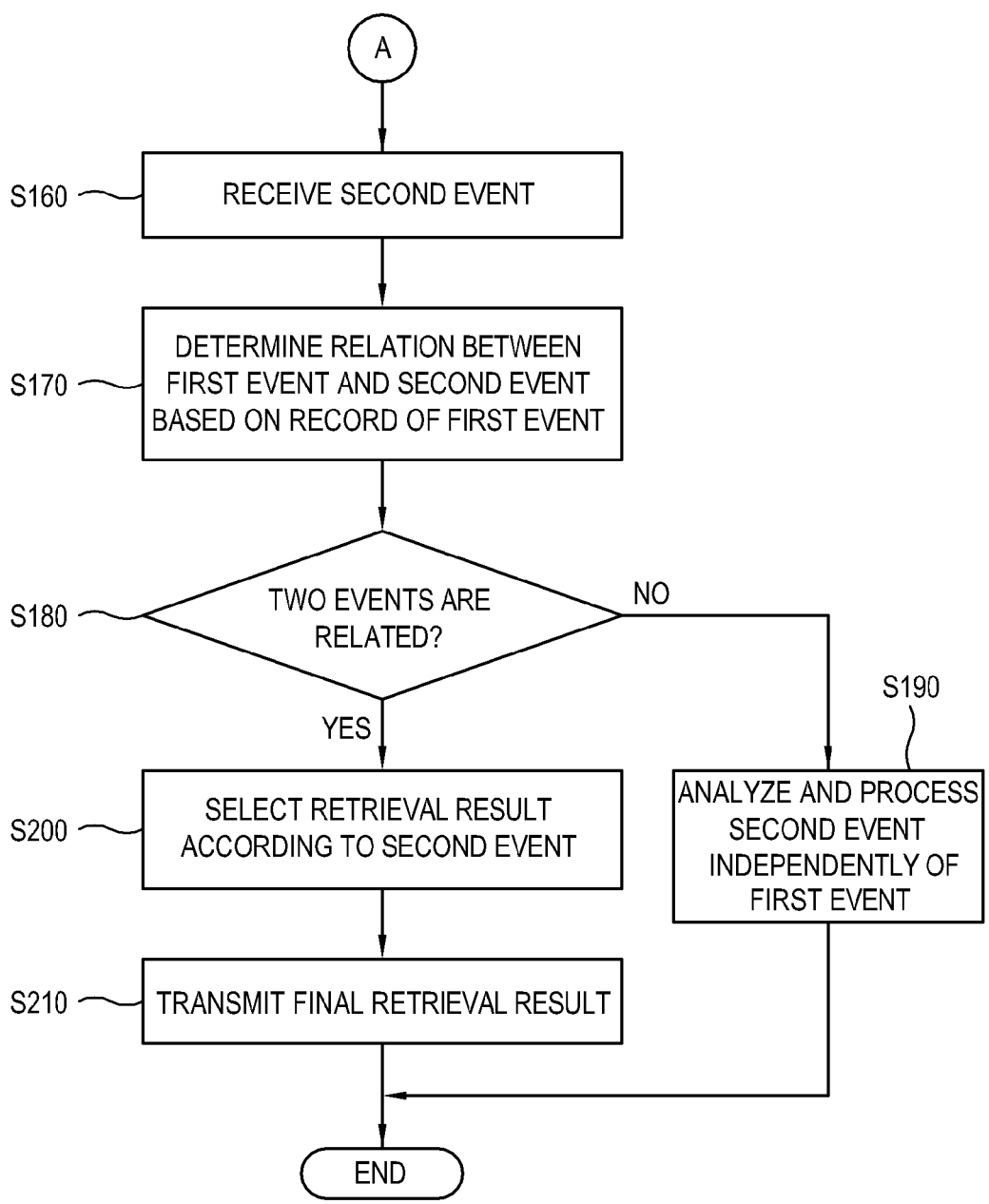

FIGS. 3 and 4 are flowcharts illustrating a method where the interactive server 300 provides a search result corresponding to an event to the display apparatus 100.

As shown in FIG. 3, in operation S100, the interactive server 300 receives a first event that may be, for example, a voice instruction by a speech from the display apparatus 100.

In operation S110, the interactive server 300 analyzes the first event to derive a search keyword.

In operations S120, the interactive server 300 performs retrieval using the derived search keyword and stores a record of generating and processing the first event.

In operation S130, the interactive server 300 determines whether there is a plurality of search results.

When a single result is retrieved, the interactive server 300 transmits the search result to the display apparatus 100 and terminates in operation S140.

When there is a plurality of search results, the interactive server 300 transmits the search results to the display apparatus 100 and requests the display apparatus 100 to select one of the search results in operation S150.

As shown in FIG. 4, the interactive server 300 receives a second event, which may include a selection instruction, from the display apparatus in operation S160. Here, the second event may occur by a user input to the display apparatus 100 in a non-speech method.

In operation S170, the interactive server 300 determines relation between the first event and the second event, that is, whether to process the second event dependently from the first event, with reference to the pre-stored record of generating and processing the first event. For example, the interactive server 300 may determine whether the second event is a selection instruction with respect to the results retrieved by the first event.

When there is no relation between the first event and the second event in operation S180, the interactive 300 analyzes and processes the second event separately from the first event in operation S190.

However, when the second event is a selection instruction with respect to the results retrieved by the first event in operation S180, the interactive server 300 may select a search result based on the second event in operation S200. In this process, the interactive server 300 may perform additional retrieval if necessary.

In operation S210, the interactive server 300 transmits a final search result according to the first event and the second event to the display apparatus 100.

Hereinafter, an internal configuration of the interactive server 300 will be described in detail with reference to FIG. 5.

Figure 5:
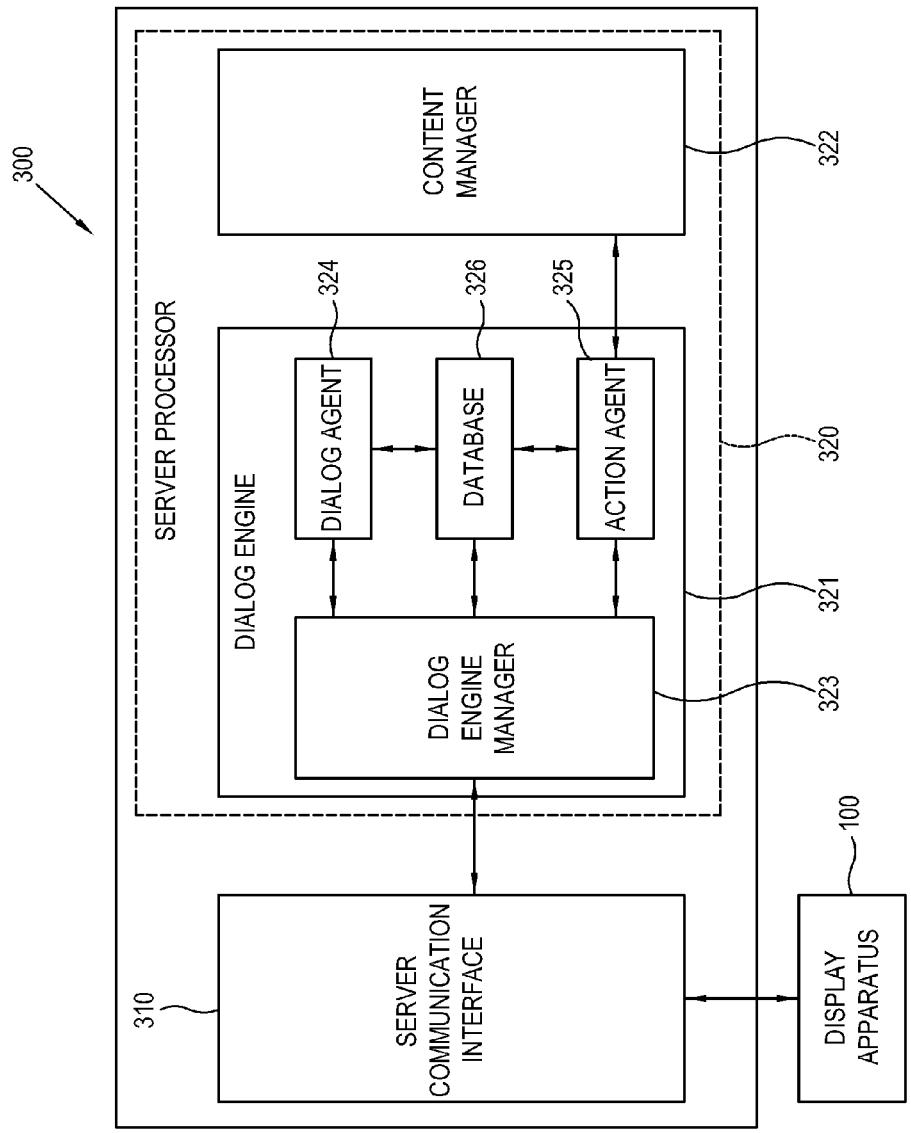
FIG. 5 is a block diagram illustrating a configuration of subdivisions by functions of a server processor similar to the interactive server of FIG. 2 according to an exemplary embodiment.

FIG. 5 is a block diagram illustrating the configuration of subdivisions by functions of the server processor 320 of the interactive server 300.

As shown in FIG. 5, the server processor 320 of the interactive server 300 may include a dialog engine 321 to analyze a voice command received through the server communication interface 310 and a content manager 322 to perform retrieval based on a search keyword transmitted from the dialog engine 321.

The dialog engine 321 includes a dialog engine manager 323, a dialog agent 324, an action agent 325 and a database 326. The server processor 320 or the dialog engine 321 is functionally divided into the foregoing components for convenience but is not limited to the configuration mentioned above.

Further, these components may be hardware elements, software elements or combinations thereof.

The dialog engine manager 323 transmits an event in a form of a voice command transmitted to the dialog engine 321 to the dialog agent 324. The dialog agent 324 analyzes content of the event, generates an analysis result into structured data, and returns the data to the dialog engine manager 323.

Here, the structured data generated by the dialog agent 324 is referred to as a dialog frame hereinafter. The dialog frame is data which includes the content of the voice command event and is obtained by structuring the voice command according to categories so that the dialog engine manager 323, the action agent 325 and the content manager 322 may decode and refer to the command. Categories and structures may be determined variously depending on a design of the server processor 320.

The dialog frame may include a user's objective of the voice command, attributes needed to achieve the objective, and information on values of the attributes. The dialog frame will be described in detail.

The dialog engine manager 323 transmits the dialog frame transmitted from the dialog agent 324 to the action agent 325. The action agent 325 determines an action corresponding action agent 325, and maybe from there to the content manager 322, which may then return a determination results to the dialog engine manager 323. That is, the action agent 325 determines an action corresponding to the event.

When retrieval of information is needed in the determination process, the action agent 325 transmits a keyword for search extracted from the dialog frame to the content manager 322 to request retrieval of information. The content manager 322 performs retrieval with the transmitted keyword from various kinds of search databases inside or outside the interactive server 300 and returns a search result to the action agent 325.

When the action corresponding to the event or the search result is received from the action agent 325, the dialog engine manager 323 transmits the received result to the server communication interface 310 to be transmitted to the display apparatus 100.

The database 326 includes whole information that the dialog engine manager 323, the dialog agent 324 and the action agent 325 may refer to in the foregoing process. For example, the database 326 may include context information, event record information, and dialog model information that the dialog agent 324 may use to generate the dialog frame and action model information that the action agent 325 may then use to determine the action corresponding to the event.

With this structure, an operation of the interactive server 300 returning a result corresponding to a voice command received from the display apparatus 100 to the display apparatus 100 will be described in detail.

Figure 6:
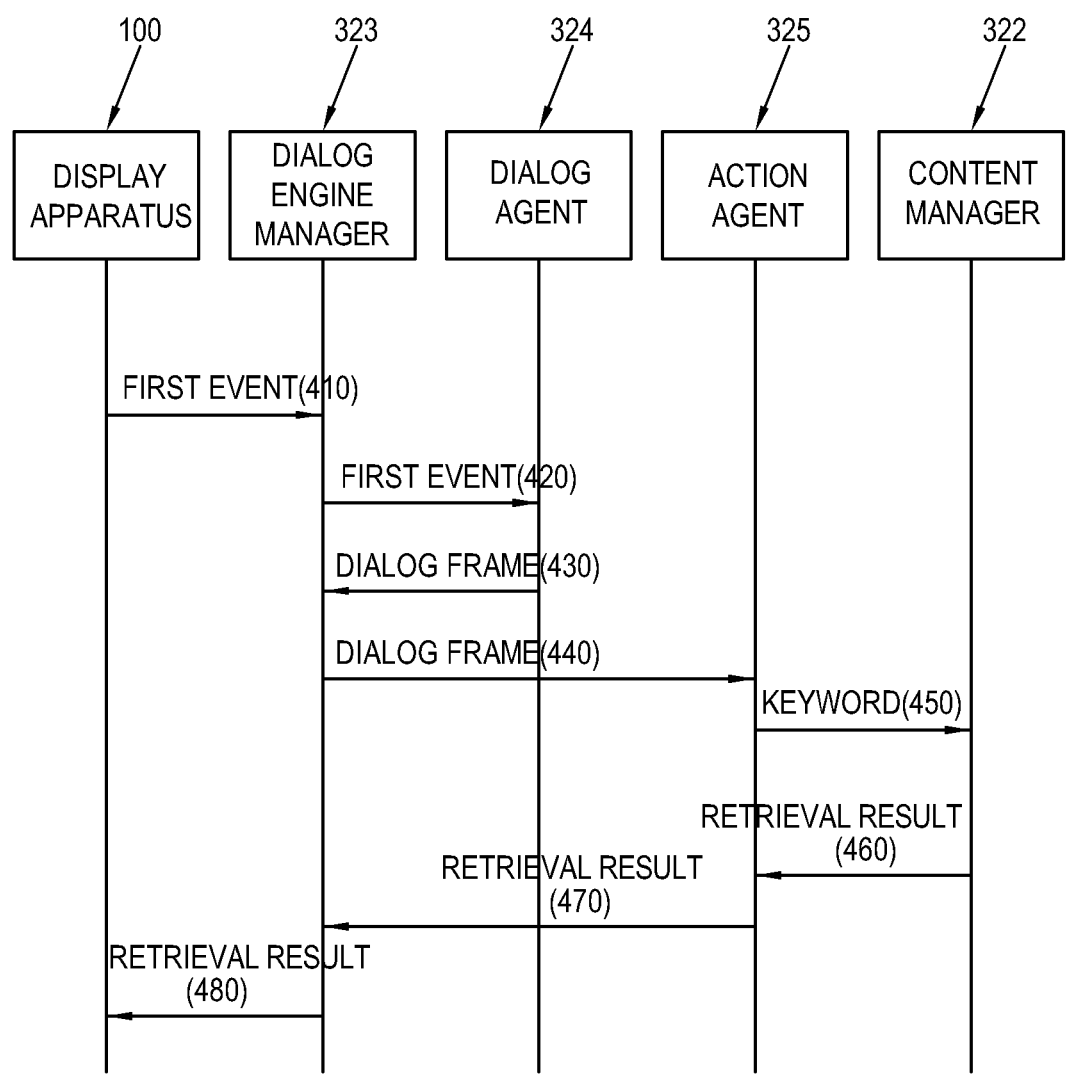
FIGS. 6 and 7 illustrate data transmission relations between the display apparatus and the interactive server similar to the server of FIG. 2 and between components of the interactive server according to one or more exemplary embodiments.
Figure 7:
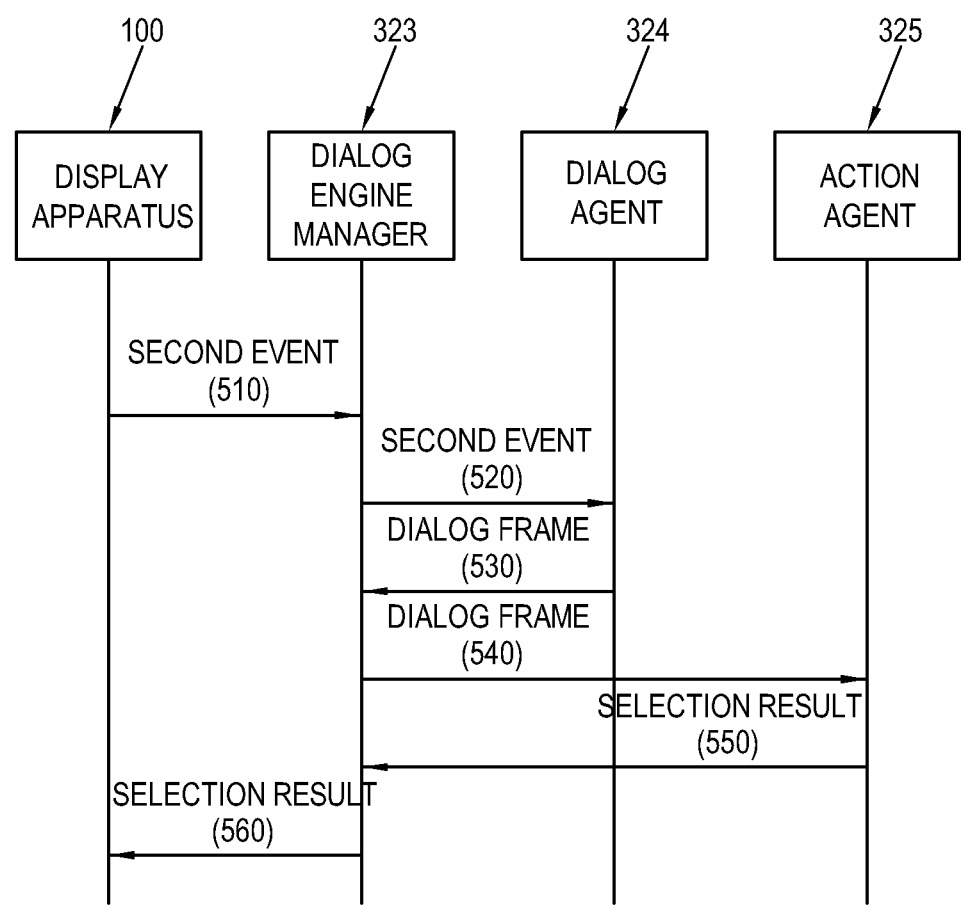

FIGS. 6 and 7 illustrate data transmission relations between the display apparatus 100 and the interactive server 300 and between the components of the interactive server 300.

As shown in FIG. 6, when the user says "who is the cast of 'Program ABC' this week?", the display apparatus 100 acquires a voice command corresponding to the speech. The voice command corresponding to the speech is defined as a first event. The display apparatus 100 transmits the first event to the interactive server 300 (410).

The dialog engine manager 323 transmits the first event received by the server communication interface 410 to the dialog agent 324 (420).

The dialog agent 324 analyzes the first event to make a dialog frame corresponding to the first event. When the first event includes content "who is the cast of 'Program ABC' this week?," the dialog frame may be expressed as follows.

(1) Objective: To inquire about the cast of the program
(2) Title: Program ABC
(3) Time: This week In the dialog frame, "Objective," "Title" and "Time" are conditional categories of the dialog frame, and the respective conditional categories include attribute values of "To inquire about the case of the program," "Program ABC" and "This week." The dialog agent 324 analyzes content of the event to derive a category of a condition which includes each keyword included in the first event and an attribute value by each category.

When the dialog frame is received from the dialog agent 324 (430), the dialog engine manager 323 transmits the dialog frame to the action agent 325 (440).

The action agent 325 makes the following keywords based on the transmitted dialog frame and transmits the keywords to the content manager 322 (450).

(1) Title: Program ABC
(2) Time: 2013/06/03~2013/06/09

An attribute value of a time condition category may need to include a specific data for retrieval. To this end, the action agent 325 determines a specific date and time period this week as from current time on the basis of an attribute value of "this week" in a time category of the dialog frame.

The content manager 322 performs retrieval on a search service of various types of content and metadata using the keywords transmitted from the action agent 325. A target of retrieval may be all database, search services and content services accessible to the content manager 322.

The content manager 322 transmits a search result to the dialog agent 324 (460). For example, a plurality of results may be retrieved as follows.

(1) program ABC/2013.06.04 17:00/Channel 4
(2) program ABC/2013.06.08 10:00/Channel 20
(3) program ABC/2013.06.09 20:00/Channel 35

Each search result may include a title and air time of the program and channel information on the program, and further may include cast information. According to the search results, "Program ABC" is broadcasted "this week" on three occasions.

The action agent 325 transmits the search results to the dialog engine manager 323 (470). In this process, because there is the plurality of search results, the action agent 325 adds a command that the display apparatus 100 displays the plurality of search results to be selectable.

The dialog engine manager 323 transmits the search results and the command to the display apparatus 100 (480).

As shown in FIG. 7, the display apparatus 100 displays the plurality of search results to be selectable by the user according to the instruction received from the dialog engine manager 323 and directs the user to select one of the displayed search results via a system speech of the display apparatus 100.

Accordingly, the user inputs an instruction to select a first search result in a non-speech method, such as via manipulation of a button on a remote controller or a gesture. Such input is defined as a second event.

The display apparatus 100 generates a virtual voice command including content of the second event corresponding to the second event. Here, the display apparatus 100 converts the second event into a form of a voice command, similar to the first event, so that the interactive server 300 provided to recognize an event in a voice command form by a speech recognizes the second event. The second event may include, for example, content "Number 1."

The display apparatus 100 transmits the second event to the dialog engine manger 323 (510).

The dialog engine manager 323 transmits the second event to the dialog agent 324 (520).

As the second event includes only the content "Number 1," the dialog agent 324 has difficulty in processing the second event only with the content of the second event. To this end, the dialog agent 324 imports processing status information on the first event from a record of processing previous events and generates a dialog frame as follows based on the imported information.

(1) Objective: To inquire about the cast of the program
(2) Order: 1

Although an objective category and an attribute value thereof of the dialog frame are not included in the content of the second event, the dialog agent 324 may generate the dialog frame with the aforementioned details by referring to the first event associated with the second event.

The dialog agent 324 transmits the generated dialog frame to the dialog engine manager 323 (530), and the dialog engine manager 323 transmits the dialog frame to the action agent 325 (540).

The action agent 325 selects the first search result among the three search results retrieved with the first event based on an attribute value of an order condition category of the dialog frame. The action agent 325 transmits a selection result "Program ABC/2013.06.04 17:00/Channel 4" to the dialog engine manager 323 (550).

The dialog engine manager 323 transmits the selection result to the display apparatus 100 (560). Here, the dialog engine manager 323 may additionally transmit a system speech command to the display apparatus 100, the system speech command being made by the dialog agent 324 with reference to the selection result.

The display apparatus 100 outputs the cast of "Program ABC" broadcasted on channel 4 at 2013.06.04 17:00 via a system speech based on the transmitted command.

As described above, in the system including the display apparatus 100 and the interactive server 300 according to the present exemplary embodiment, when there is a plurality of results satisfying an objective and conditions input via a user's speech, even though the user uses a non-speech input method, such as a remote controller or gesture, along with a speech input method, a user-desired result is provided, thereby improving user convenience.

Further, although the foregoing embodiment shows that the interactive server 300 stores a record of events respectively by a speech input and a non-speech input by the user of the display apparatus 100, one or more exemplary embodiments are not limited thereto. For example, the display apparatus 100 may store a record of events, which will be described with reference to FIGS. 8 and 9.

Figure 8:
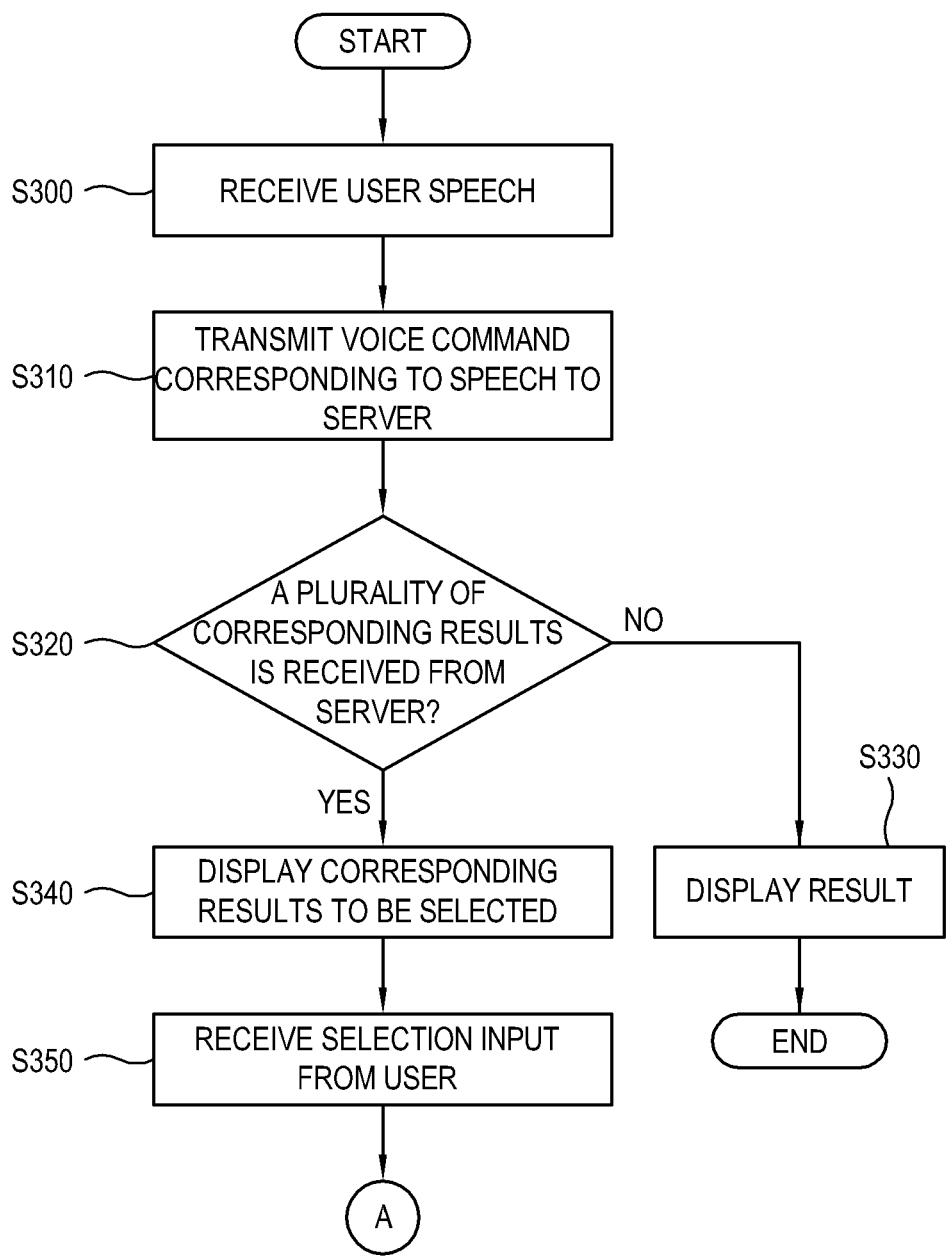
FIGS. 8 and 9 are flowcharts illustrating a control method of a display apparatus according to one or more exemplary embodiments.
Figure 9:
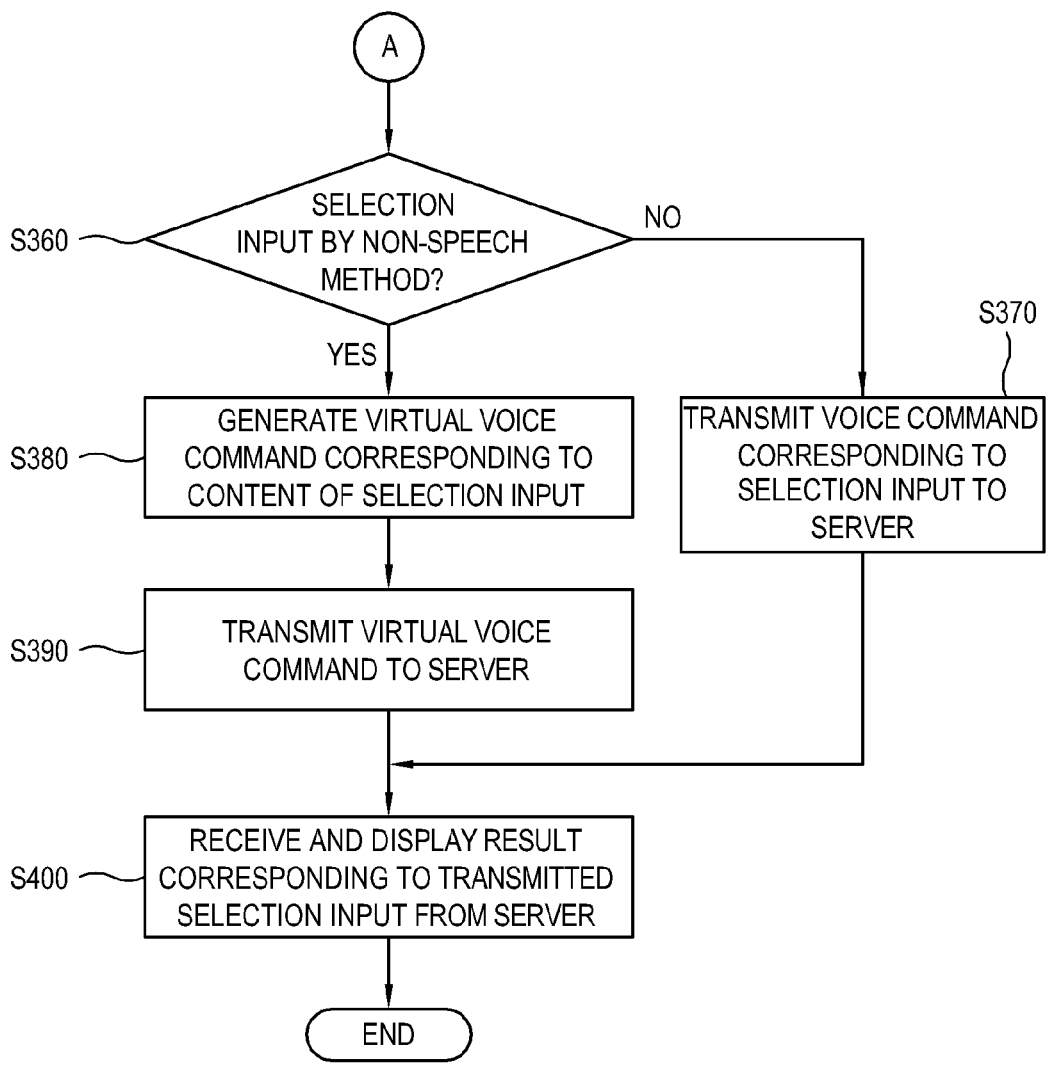

FIGS. 8 and 9 are flowcharts illustrating a control method of a display apparatus 100 according to an exemplary embodiment.

As shown in FIG. 8, the display apparatus 100 may receive a speech of the user in operation S300. The display apparatus 100 transmits a voice command corresponding to the speech of the user to the interactive server 300 in operation S310.

The display apparatus 100 determines whether there is a plurality of results corresponding to the voice command received from the interactive server 300 in operation S320.

When there is a single result corresponding to the voice command, the display apparatus 100 displays the result in operation S330.

However, when there is a plurality of results corresponding to the voice command, the display apparatus 100 displays the results to be selectable by the user in operation S340.

The display apparatus 100 receives an input of a selection by the user among the results in operation S350. During this process, the display apparatus 100 may store a record of generating and processing events of the voice command by the speech.

As shown in FIG. 9, the display apparatus 100 determines whether the input of the selection is by a speech method or a non-speech method in operation S360.

In this process, the display apparatus 100 determines whether the input of the selection received in operation S350 is relevant to the speech in operation S300 by referring to a pre-stored record of previous events. When the input of the selection is relevant to the speech, the display apparatus 100 performs operation S360.

When the input of the selection is conducted by the speech method, the display apparatus 100 transmits a voice command corresponding to the input of the selection to the interactive server 300 in operation S370 and moves to operation S400.

When the input of the selection is conducted by the non-speech method, the display apparatus 100 generates a virtual voice command corresponding to the input of the selection in the non-speech method in operation S380. The display apparatus 100 transmits the virtual voice command to the interactive server 300 in operation S390.

The display apparatus 100 receives a result corresponding to the input of the selection from the interactive server 300 and displays the result in operation S400.

Further, the foregoing embodiment shows that the interactive server 300 analyzes and retrieves a result corresponding to an event that occurs in the display apparatus 100. However, the idea of one of more exemplary embodiments are not limited thereto, and the display apparatus 100 may perform at least one of the functions of the STT server 200 and the interactive server 300 in the exemplary embodiment.

Figure 10:
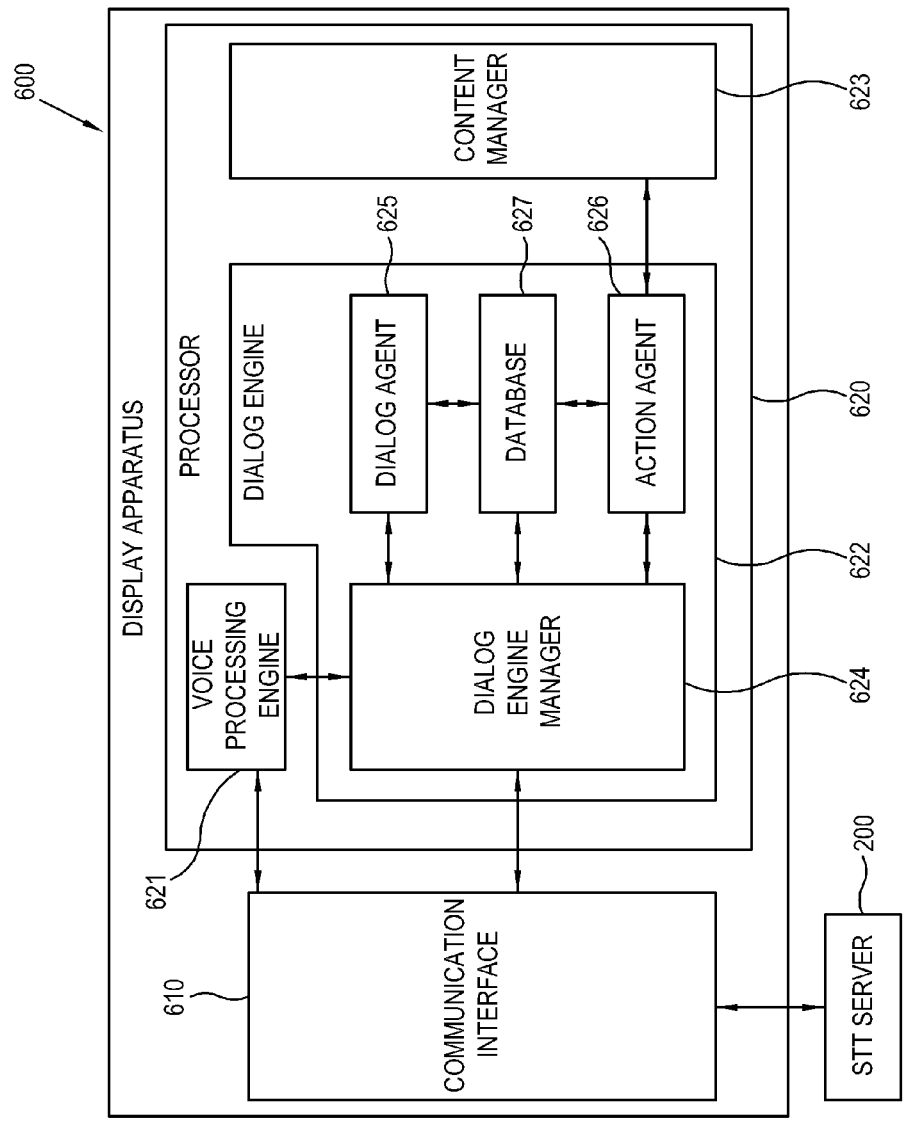
FIG. 10 is a block diagram illustrating a configuration of a processor of a display apparatus according to an exemplary embodiment.

FIG. 10 is a block diagram illustrating a configuration of a processor 620 of a display apparatus 600 according to an exemplary embodiment.

As shown in FIG. 10, the display apparatus 600 according to the present embodiment includes a communication interface 610 and the processor 620. Other components of the display apparatus 600 are substantially the same as those mentioned in the exemplary embodiment, and thus descriptions thereof will be omitted herein.

The processor 620 may include a voice processing engine 621 to process a speech input to the display apparatus 600, a dialog engine 622 to analyze a voice command corresponding to the speech and a content manager 623 to perform retrieval based on a search keyword transmitted from the dialog engine 622. Further, the dialog engine 622 may include a dialog engine manager 624, a dialog agent 625, an action agent 626, and a database 627. In the present embodiment illustrated in FIG. 10, components directly associated with the idea of the exemplary embodiment are mentioned only and other elements are not shown and described herein.

When a speech of the user is input, the voice processing engine 621 transmits an audio signal of the speech to the STT server 200. The voice processing engine 621 receives a voice command corresponding to the speech from the STT server 200 and transmits the voice command to the dialog engine manager 624.

Operations of the dialog engine manager 624, the dialog agent 625, the action agent 626 and the content manager 623 are substantially the same as those described in the foregoing embodiment, and thus detailed descriptions thereof are omitted herein.

Alternatively, the voice processing engine 621 of the display apparatus 600 may perform the function of the STT server 200, that is, converting the speech into the voice command. In this case, when the speech of the user is input, the voice processing engine 621 converts the speech into the voice command and transmits the voice command to the dialog engine manager 624.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A system comprising:
a server; and
at least one image processing apparatus,
wherein the server comprises:
a communicator configured to communicate with the at least one image processing apparatus;
a processor configured to:
based on an input of a speech of a user being received from the at least one image processing apparatus, control the communicator to:
transmit, to the at least one image processing apparatus, a plurality of retrieval results corresponding to the input of the speech of the user,
wherein the at least one image processing apparatus comprises:
a display;
a user interface comprising:
a speech input interface configured to receive the input of a speech of a user; and
a non-speech input interface configured to receive a non-speech user input;
a communicator configured to communicate with the server; and
a processor configured to:
based on the input of the speech being received through the speech input interface,
control the communicator of the at least one image processing apparatus to transmit the input of the speech to the server;

control the display to display the plurality of retrieval results to be selected, based on the plurality of retrieval results corresponding to the input of the speech being received from the server;
based on the non-speech user input being received through the non-speech input interface,
identify whether the non-speech user input is related to the input of the speech of the user;
based on the non-speech user input not being related to the input of the speech of the user, perform an operation corresponding to the non-speech user input, independently of the input of the speech; and
based on the non-speech user input being related to the input of the speech of the user, perform an operation on one of the plurality of retrieval results selected by the non-speech user input, based on a result of processing the input of the speech.

2. The system of claim 1, wherein the processor of the server is further configured to:
perform retrieval from a database based on the input of the speech when the input of the speech is received, and
control the communicator of the server to transmit, to the at least one image processing apparatus, one final result selected from among a plurality of retrieval results with respect to the input of the speech, based on the non-speech user input being received when the retrieval results are being displayed.

3. The system of claim 1, wherein the processor of the server is further configured to:
control the communicator of the server to transmit a request command to select one of the retrieval results when there is the plurality of retrieval results with respect to the input of the speech.

4. The system of claim 1, wherein the processor of the at least one image processing apparatus is further configured to convert the non-speech user input into a virtual voice command such that the server recognizes the non-speech user input, and control the communicator to transmit the virtual voice command to the server.

5. A control method of a server, the control method comprising:
receiving, from an image processing apparatus, an input of a speech of a user;
transmitting, to the image processing apparatus, a plurality of retrieval results corresponding to the input of the speech to be displayed on the image processing apparatus;
receiving, by the image processing apparatus, at least one image from the server the plurality of retrieval results corresponding to the input of the speech;
displaying, on the image processing apparatus, the plurality of retrieval results to be selected on a display of the image processing apparatus;
receiving a non-speech user input through a non-speech input interface of the image processing apparatus;
based on the non-speech user input being received through the non-speech input interface, identifying, by the image processing apparatus, whether the non-speech user input is related to the input of the speech of the user;
based on the non-speech user input not being related to the input of the speech of the user, performing, by the image processing apparatus, an operation corresponding to the non-speech user input, independently of the input of the speech; and based on the non-speech user input being related to the input of the speech of the user, performing, by the image processing apparatus, an operation on one of the plurality of retrieval results selected by the non-speech user input, based on a result of processing the input of the speech.

6. The control method of claim 5, further comprising:
performing retrieval from a database based on the input of the speech, and
transmitting, to the image processing apparatus, one final result selected among a plurality of retrieval results with respect to the input of the speech, based on the non-speech user input being received when the retrieval results are being displayed.

7. The control method of claim 5, wherein the receiving of the non-speech user input comprises:
transmitting, to the image processing apparatus, a request command configured to select one of the retrieval results when there is the plurality of retrieval results with respect to the input of the speech; and
receiving, from the image processing apparatus, the non-speech user input corresponding to the request command.

8. The control method of claim 5, further comprising:
converting, by the image processing apparatus, the non-speech user input into a virtual voice command such that the server recognizes the non-speech user input, and
transmitting, by the image processing apparatus, the virtual voice command to the server.

9. An image processing apparatus comprising:
a display;
a user interface comprising:
    a speech input interface configured to receive an input of a speech of a user; and
    a non-speech input interface configured to receive a non-speech user input;
a communicator configured to communicate with a server that performs retrieval processing corresponding to the input of the speech; and
a processor configured to:
    based on the input of the speech being received through the speech input interface,
    control the communicator to transmit the input of the speech to the server;
    control the display to display a received plurality of retrieval results to be selected, based on the plurality of retrieval results corresponding to the input of the speech being received from the server;
    based on the non-speech user input being received through the non-speech input interface,
    identify whether the non-speech user input is related to the input of the speech of the user;
    based on the non-speech user input not being related to the input of the speech of the user, perform an operation corresponding to the non-speech user input, independently of the input of the speech; and
    based on the non-speech user input being related to the input of the speech of the user, perform an operation on one of the plurality of retrieval results is selected by the non-speech user input, based on a result of processing the input of the speech.

10. The image processing apparatus of claim 9, wherein the processor is further configured to identify whether the non-speech user input gives an instruction to select one of the retrieval results based on the non-speech user input being received when the retrieval results are being displayed.

11. The image processing apparatus of claim 9, wherein the processor is further configured to convert the non-speech user input into a virtual voice command such that the server recognizes the non-speech user input, and control the communicator to transmit the virtual voice command to the server.

12. A control method of an image processing apparatus, the control method comprising:
receiving an input of a speech of a user;
communicating with a server that performs retrieval processing on the input of the speech;
transmitting the input of the speech to the server based on the input of the speech being received;
receiving from the server a plurality of retrieval results on the input of the speech;
displaying the plurality of retrieval results for selection on a display of the image processing apparatus;
receiving a non-speech user input through a non-speech input interface of the image processing apparatus;
based on the non-speech user input being received through the non-speech input interface, identifying whether the non-speech user input is related to the input of the speech of the user;
based on the non-speech user input not being related to the input of the speech of the user, performing an operation corresponding to the non-speech user input, independently of the input of the speech; and
based on the non-speech user input being related to the input of the speech of the user, performing an operation on one of the plurality of retrieval results selected by the non-speech user input, based on a result of processing the input of the speech.

13. The control method of claim 12, further comprising:
identifying whether the non-speech user input gives an instruction to select one of the retrieval results based on the non-speech user input being received when the retrieval results are being displayed.

14. The control method of claim 13, further comprising:
converting the non-speech user input into a virtual voice command that the server recognizes, and
transmitting the virtual voice command to the server.

* * * * *